UNITED STATES PATENT OFFICE 2,370,454

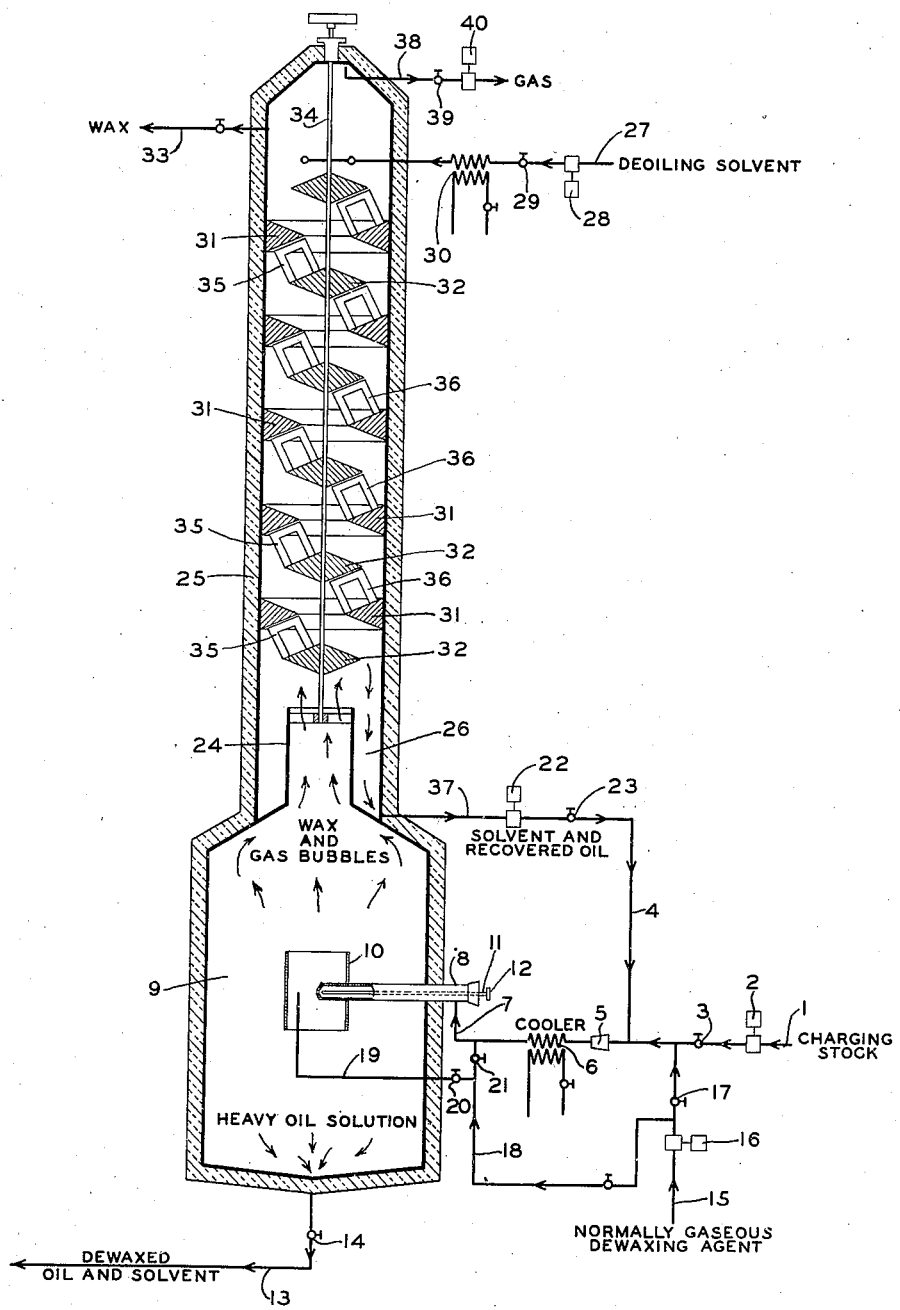

APPARATUS FOR SEPARATING WAX AND OIL

Eddie M. Dons and Oswald G. Mauro, Tulsa, Okla., assignors to Mid-Continent Petroleum Corporation, Tulsa, Okla., a corporation of Delaware Application February 28, 1942, Serial No. 432,865

1 Claim. (Cl. 196—18)

This invention relates to apparatus for separating wax and oil. The invention may be employed in separating wax and oil found in various kinds of materials including mineral oils, petrolatum, slack wax and vegetable waxes. It can be conveniently used in dewaxing petroleum lubricating oils to produce low pour point lubricants, or in obtaining high melting point waxes from petrolatum, and in separating constituents of slack wax, as well as in the treatment of other products to separate waxy materials.

The main object of the invention is to produce a relatively simple and inexpensive system lacking several serious objections found in prior dewaxing systems. The commercial development of this very old art has passed through a series of stages, which eventually led to the modern dewaxing systems wherein extremely large filters are employed to separate wax from diluted oil. Cold settling, using naphtha or the like as a diluent, is an old sluggish process, popular many years ago, but now practically abandoned and superseded by filtration.

Nevertheless, the highly developed conventional filtering processes now in general use are complex systems, involving considerable trouble and expense, and lacking the desired efficiency in the separation of wax from oil. In commercial practice, clusters of wax crystals are deposited on the filters with portions of the oil solution trapped or occluded in the wax clusters. The filtration does not remove this occluded oil solution from the wax clusters, and additional portions of the solution are trapped between the clusters on the filters.

A primary object of the invention is to advance this art by producing a very simple and inexpensive commercial system, lacking inherent defects, or objections, found in the dewaxing systems which have been generally adopted in this industry.

A specific object of the present invention is to produce an entirely feasible dewaxing system wherein gas bubbles are deliberately employed to aid in the separation of wax and oil. We realize that experts in this art have regarded the creation of bubbles as a nuisance or objectionable condition to be carefully avoided in the separation of wax and oil. However, a study of the plan herein set forth will show that we have established novel conditions wherein this radical departure from the usual practice is employed to obtain substantial advantages.

Instead of exercising precautions to avoid a possibility of slight bubbling, we have created cooperative conditions wherein rather intense bubbling is an outstanding factor tending to promote the separation of wax and oil. For example, in our new system a continuous stream of gas bubbles may be combined with a dewaxing solution heavier than wax, so as to forcibly lift the relatively light wax in the heavy solution, and in a desirable form of the invention, the production of gas may be deliberately resorted to for the purpose of disintegrating the wax. This bubbling, resulting in forcible disintegration of the wax, is contrary to the generally accepted practices and theories in this art, but we have created a novel series of conditions wherein the departure from conventional theories is unexpectedly employed to dispose of perplexing old problems.

More specifically stated, the wax may be precipitated by cooling in a relatively heavy solution of oil and dewaxing solvent, and then transmitted into a settling chamber, while discharging gas bubbles into the waxy mass in said chamber, thereby causing the wax to rise with the bubbles, so as to forcibly lift the wax in said heavy oil solution. The bubbles will positively increase the velocity of the rising wax, and this is a highly important factor in commercial production, where the object is to avoid unnecessary time in separating the wax from the oil. When the gas bubbles are deliberately created and employed to forcibly lift the wax as herein described, the relatively heavy oil solution is quickly dewaxed, and a continuous stream of the heavy dewaxed solution may be discharged from a low portion of the separating chamber, while a continuous stream of the rising wax is discharged from an upper portion of said chamber. The bubbling is thus employed to select and readily separate a rising mass of light wax from the descending body of relatively heavy oil solution. This simple separation eliminates the usual high costs of a large filtering plant. Furthermore, the simple new system can be employed to release and effectively remove portions of the oil solution which are ordinarily trapped in the wax cake on a filter.

An important condition of the invention herein claimed appears in the production of an oil solution heavier than wax, combined with gas bubbles which rise with the wax in said heavy oil solution. However, these gas bubbles which serve as a dewaxing agent, may be derived from numerous different normally gaseous materials, including carbon dioxide, sulfur dioxide, methane, ethane, hydrogen, or any other suitable normally gaseous material. The normally gaseous material may be injected directly into the dewaxing chamber as a separate stream, or it may enter with a stream of the waxy mixture to be separated, and it may be combined with an incoming stream of charging stock, either before or after said stream is cooled to precipitate or solidify the wax content.

If the selected normally gaseous material would tend to aid in selectively precipitating the wax, it may be advantageously added before the oil solution reaches the cooling zone. A special advantage is gained by including portions of the normally gaseous material in the precipitated wax clusters, as a subsequent expansion of this normally gaseous material in the wax clusters will have a sudden explosive force which forcibly disintegrates the wax clusters, thereby positively releasing the oil solution trapped in the wax. The liberated oil solution will then be free to separate from the wax in the dewaxing or deoiling operation. This is a substantial advantage over the usual commercial practice, wherein trapped or occluded oil is inevitably retained within and between wax clusters deposited on the filters.

In considering the effect of the liberated gas bubbles, it will be observed that bubbles tend to adhere to any solid material. The gas is preferably released in the form of nascent or minute bubbles which cling to the wax particles, and act like "life preservers" to forcibly and quickly lift the wax in the heavy oil solution.

With the foregoing and other objects in view, the invention comprises a novel combination and arrangement of parts hereinafter more specifically described and shown in the accompanying drawing to illustrate one form of the invention. However, it is to be understood that the invention comprehends changes, variations and modifications within the scope of the claim hereunto appended.

The accompanying drawing is a diagrammatical view of a system which may be employed to carry out one form of the invention.

A continuous regulated stream of the wax-bearing charging stock, for example, a lubricating oil stock, enters the system through a pipe 1 which may be provided with a pump 2 and a regulating valve 3. A continuous stream of selective dewaxing solvent, from sources to be hereafter described, is conducted through a pipe 4 to the oil supply pipe 1. The continuous streams of oil and dewaxing solvent are united in the pipe 1 and transmitted through a mixing nozzle 5 where the oil and solvent are mixed at a temperature high enough to form the desired dewaxing solution.

The continuous stream of solution is transmitted through a cooler, or chiller, 6 where the flowing solution is cooled to a temperature desired for precipitation of wax in the liquid solution.

The solidified wax crystals are usually united in the form of clusters, with portions of the oil solution trapped or occluded in the clusters. However, a pipe 7 conducts a continuous stream of the mixture of wax and oil solution into a valve housing 8 extending into a separating chamber 9. The discharge end of this valve housing may be surrounded by a shell or baffle 10 in the form of a vertical tube arranged to prevent violent agitation in more remote portions of said chamber 9. An elongated needle valve 11 may be employed to regulate the discharge from an orifice at the inner end of the housing 8, said valve having an operating handle 12 exposed at the exterior of the separating chamber 9.

This separating chamber 9 may be termed a dewaxing chamber, or settling chamber. The incoming stream of cooled solution and wax may be delivered to this chamber at approximately the temperature selected for precipitation of wax in the cooler, or chiller, 6. For example, in dewaxing lubricating oils this temperature may be about 0° F., although higher and lower temperatures may be employed in separating various kinds of waxy materials. This chamber 9 is covered with insulation to aid in maintaining the desired temperatures therein.

We are assuming that a relatively dense or heavy solvent has been selected for the dewaxing operation, and that the viscosity and interfacial tension are low enough to allow the wax particles to rise in the dense solution. In this event, the major portion of the dense solution will move downwardly to the bottom of the separating chamber 9, where it is discharged through a pipe 13, said pipe having a regulating valve 14 adjusted to regulate the flow therein. This outgoing solution is free of wax and it may be distilled in any suitable manner to remove the solvent from the dewaxed oil.

It will be observed that a highly valuable commercial advantage can be gained by a rapid dewaxing operation wherein the rising wax is quickly separated from the descending oil solution, and that a further advantage can be obtained by a convenient cooperative means for deoiling the wax.

The dewaxing apparatus includes a means for discharging gas bubbles into the waxy mass in the separating chamber 9, thereby causing the bubbles to cling to and rise with wax particles in the relatively heavy oil solution, so as to forcibly lift said wax particles in the heavy solution. The descending oil solution is thus very easily, quickly and economically dewaxed in the simple settling chamber 9, and immediately discharged at the bottom, while relatively light wax particles are boosted to the top of said chamber where they may be discharged in a continuous stream with the gas bubbles.

The gas bubbles are produced by introducing a stream of normally gaseous dewaxing agent into the system. To more specifically explain this condition we have shown a supply pipe 15 leading from a source of normally gaseous dewaxing material, and a pump 16 to inject said material into the system. The pipe 15 leads to the pipe 1 which conducts the charging stock into the system, and a valve 17 may be adjusted to regulate, or prevent, the delivery of said normally gaseous material to the pipe 1. The supply pipe 15 is also provided with a branch 18 leading to the pipe 7, and a second branch 19 leading to the interior of the separating chamber 9. As shown diagrammatically in the drawing, the pipe 19 may terminate in the shell or baffle 10, and it is provided with a control valve 20, while the pipe 18 is equipped with a valve 21 to control the delivery of normally gaseous material to the pipe 7. The valves 17, 20 and 21 can be set to selectively regulate or control the delivery of predetermined quantities of the normally gaseous dewaxing agent to the desired point, or points, in the waxy material.

If the selected normally gaseous material has no substantial value in the precipitation of wax at the cooler 6, it may be introduced through the branch 18 to the pipe 7, or through branch 19 to a point adjacent the discharge end of the valve housing 8.

However, when said normally gaseous material is present in the cooler 6, it will form part of the oil solution trapped in the clusters of precipitated wax, and the valve 11 may be adjusted to provide for a reduction in the pressure of the mixture entering the dewaxing chamber 9. In this event, the trapped normally gaseous material will suddenly expand in the wax clusters, so as to forcibly rupture or disintegrate the clusters entering the chamber 9, thereby positively liberating the trapped oil solution in said chamber. This releases all of the heavy oil solution for the dewaxing operation in said chamber 9.

The dewaxing solvent from pipe 4 is preferably a continuous stream of relatively heavy normally liquid solvent delivered through a pump 22 and valve 23. The continuous stream of charging stock is supplied through the pump 2, and the continuous stream of normally gaseous dewaxing agent is delivered through the pump 16. These pumps can be regulated to provide a relatively high pressure on the incoming streams, while the valve 11 is adjusted to provide a sudden reduction of pressure on the mixed stream at the inlet of the dewaxing chamber 9. Under these conditions, the normally gaseous dewaxing agent may enter the system in a liquid state, and thereafter expand into gas bubbles at the inlet of the dewaxing chamber, where the waxy mixture is discharged from the valve housing 8. Any suitable normally gaseous material may be employed. Specific examples of a few of the suitable normally gaseous agents include carbon dioxide, methane, ethane, sulfur dioxide and hydrogen.

Attention is now directed to the separating zone, or dewaxing zone, established near the point where the incoming mixture of cooled solution and wax begins to separate in the chamber 9. The bubbles tend to cling to surfaces of the wax particles which move upwardly and carry with them portions of the oil solution, including oily films and relatively free portions of the solution between the rising wax particles. The major portion of the heavy oil solution freely descends to the bottom of the chamber 9, but a minor portion of this oil solution is carried upwardly with the rising wax, which is discharged from an upper portion of said chamber 9.

Therefore, as a supplement to the efficient dewaxing operation herein claimed, advantages can be gained by subjecting this outgoing wax to a simple deoiling operation. For example, the wax may be transmitted through a counterflowing stream of selective oil solvent to dissolve and recover oil solution carried by the wax.

To illustrate a suitable condition of this kind, we have shown a tubular discharge member 24 through which a continuous stream of the waxy material is discharged from the upper portion of the dewaxing chamber, and a counterflow deoiling system including an insulated column 25 above said dewaxing chamber. The tubular discharge member 24 is surrounded by but separated from, the lower portion of said column 25, so as to provide an annular well or settling compartment 26 around the tubular member 24.

The mass of wax rising from the tubular member 24 passes through a relatively heavy descending stream which may be produced by continuously introducing a stream of deoiling solvent through a pipe 27 leading into the upper portion of the column 25. The pipe 27 is equipped with a pump 28 and a regulating valve 29 adjusted to regulate the flow of the incoming deoiling solvent, as well as a variable cooler 30 regulated to control the temperature of this solvent stream. This temperature may be slightly higher than the temperature of the solution discharged from the cooler 6 to the dewaxing chamber 9. For example, if the dewaxing solution is chilled to a temperature of 0° F. in the cooler 6, the incoming deoiling solvent from the cooler 30 may be at a temperature of about 10° F. to about 15° F. By deliberately maintaining a temperature differential of this kind, the deoiling solvent will more effectively deoil the wax.

When a heavy deoiling solvent is employed, the stream of deoiling solvent from the cooler 30 will descend in direct contact with the rising stream of wax particles, so as to selectively dissolve the free portions of oil solution carried by the wax, and also forcibly scrub the oily films from the rising wax particles. This action may be aided by any suitable mechanical appliances. For example, the column 25 may be provided with alternating baffles including a series of rings 31 extending inwardly from the inner face of the column 25 and a series of central baffle members 32 arranged as shown in the drawing to produce an elongated tortuous passageway wherein the rising wax particles move back and forth in a zigzag course. The stream of selective deoiling solvent descends through the rising stream of wax particles, and the counterflowing streams are divided into numerous layers of different specific gravities contacting with each other and advancing in intersecting paths as they flow from one baffle to another. These baffles are preferably provided with upwardly inclined top and bottom faces to permit free movement of the rising wax particles. It will be observed that the rising layers of wax particles move upwardly while in contact with the upwardly inclined bottom faces of the baffles, and that said wax particles repeatedly intersect the descending solvent while rising from one upwardly inclined plane to another. A continuous stream of deoiled wax with a minor portion of the solvent may be discharged through a pipe 33 above the inlet for the deoiling solvent.

The inclined faces of the baffles tend to prevent the wax particles from clinging to said baffles. However, any suitable mechanical means may be employed to prevent or limit the growing of wax crystals which might otherwise extend from the bottom faces of the baffles. For example, the central baffles 32 may be fixed to a slowly rotating shaft 34 so as to rotate with the shaft, and scrapers 35 may extend from the top faces of these rotary baffles to remove waxy material from the bottoms of the stationary baffle rings 31. These stationary baffles may be likewise provided with scrapers 36 extending from their top faces to remove waxy material from the bottom faces of the rotating baffles.

An interesting condition appears in the effective cleansing of the rising wax particles due to the forcible scrubbing and dissolving action of the selective deoiling solvent which repeatedly crosses the path of the wax in the deoiling zone. Attention is also directed to the condition at the lower portion of this deoiling zone where the descending solvent stream is diverted from the interior of the dewaxing chamber 9. This deflection of the descending solvent is due partly to the upwardly force of the rising stream of wax particles issuing from the top of the tubular member 24, and partly to the descending current in the surrounding settling compartment 26. The lowermost central baffle 32 also tends to deflect the descending solvent toward the compartment 26. Some of the wax particles may be swept into the settling compartment 26, but these wax particles are so light that they will eventually rise in the heavy solvent and return to the mass of wax, instead of passing to the bottom of said settling compartment 26.

The selective deoiling solvent performs a very important function in selectively removing oil carried by the wax particles. However, most of the oil is removed from the wax in the dewaxing chamber 9, so the deoiling solvent stream which descends through the settling compartment 26 contains only a small percentage of the original oil. Therefore, this reasonably fresh body of selective oil solvent can be very conveniently used in the dewaxing stage of the process. For example, it may be continuously transmitted from the bottom of the settling compartment 26 through a pipe 37 and thence through the pump 22 and valve 23 in the pipe 4 leading to the continuous incoming stream of wax-bearing oil in the pipe 1.

The velocity and time of the deoiling action may be regulated to dissolve practically all of the oil carried by the wax, or any desired percentage of oil may be discharged with the wax, depending upon the commercial requirements.

It is to be understood that the invention is not limited to the specific arrangements of chambers and zones herein disclosed to illustrate one form of the invention, and that any suitable heavy solvents may be employed to produce the counterflow of wax and solvent. However, a desirable selective deoiling solvent may be composed of methylene dichloride alone or combined with a relatively small percentage of wax-rejecting solvent. More specifically stated, the incoming deoiling solvent from pipe 27 may consist of about 90 per cent methylene dichloride and about 10 per cent dichlorethyl ether or sulfur dioxide. Continuing this specific illustration we find that the used deoiling solvent and the oil dissolved thereby may be discharged through pipes 37 and 4, to the incoming stream of oil. To produce a desirable selective dewaxing solvent composition, a regulated quantity of wax-rejecting solvent may be added in any suitable manner before the stream reaches the cooler 6. For example, the normally gaseous dewaxing agent from pipe 15 may have wax-rejecting properties. Such properties are found in methane, ethane, carbon dioxide, sulfur dioxide, and other normally gaseous materials.

Other examples of the relatively heavy dewaxing solvents include perchlorethylene and dichlorodifluoromethane, either of which may be combined with a wax-rejecting solvent to precipitate wax in the cooler 6.

Sulfur dioxide is one of the wax-rejecting solvents suitable for use in the precipitation of wax in the cooler 6, and in cases where high melting point waxes are to be separated at relatively high temperatures, or when the separating zone can be maintained under a partial vacuum, sulfur dioxide can be employed to produce gas bubbles in the settling chamber.

The gas bubbles eventually rise to the top of the column 25, where they are discharged through a pipe 38 provided with a valve 39 and a pump 40. This gas may be recovered and stored for reuse in the system. The pump 40 may be employed to maintain a partial vacuum in the separating system, or to compress the gas as a step in converting said gas into a liquid. The gas outlet formed by the pipe 38 is preferably higher than the wax outlet 33, so as to separate the gas from the wax.

When the system is in service, there is a continuous column of liquid and wax extending from the bottom of the dewaxing chamber 9 to the upper end portion of the counterflow deoiling system, and in a very tall column of this kind, the head pressure may be great enough to prevent immediate vaporization of all of the normally gaseous material discharged from the valve housing 8. In some cases, a portion of the normally gaseous material will be converted into gas bubbles under the relatively high pressure in the dewaxing chamber 9, while other portions of said normally gaseous material will be successively converted into bubbles while rising through the higher zones of gradually decreasing pressure in the counterflow deoiling zone. This successive bubbling at different elevations is a desirable condition, tending to separate the wax particles for more effective deoiling, and also tending to increase the speed of the rising wax in the descending oil solvent.

If the used deoiling solvent is employed in forming the dewaxing solvent, any wax dissolved by the deoiling solvent will be carried into the incoming charging stock, and thereby recovered in the system. Another advantage of this feature appears in the convenient recovery of valuable oil which is constantly carried by the selective deoiling solvent flowing from the deoiling zone to the incoming charging stock.

We claim:

In an apparatus for separating oil and wax, a cooler wherein a liquid solution of the oil and wax is cooled to precipitate the wax in the liquid solution, separating means including a settling chamber having an inlet communicating with said cooler to receive a mixture of liquid oil solution and wax, said settling chamber also having an outlet for the dewaxed solution lower than said inlet to provide for the discharge of relatively heavy dewaxed solution, and a wax outlet higher than said inlet to provide for discharge of the wax, a baffle device surrounding said inlet to confine the incoming mixture of oil solution and wax, and means for liberating gas bubbles in the waxy mass at said baffle device, the last mentioned means comprising a source of normally gaseous dewaxing material communicating with the interior of said baffle device to transmit said normally gaseous material into the mixture of liquid oil solution and wax, and regulating devices controlling the delivery of said normally gaseous material to said baffle device, so as to regulate said liberation of gas bubbles.

EDDIE M. DONS.
OSWALD G. MAURO.